(12) United States Patent
Santoro, Jr. et al.

(10) Patent No.: US 6,238,012 B1
(45) Date of Patent: May 29, 2001

(54) DIRECT MANIPULATING DIRECT-GRADUATED RELEASE CAP FOR 26-TYPE CONTROL VALVES

(75) Inventors: Ralph Santoro, Jr., New Kensington; Lawrence M. Kushnir, Jr., North Huntingdon, both of PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/106,913

(22) Filed: Jun. 29, 1998

(51) Int. Cl.[7] ...................................................... B60T 15/16
(52) U.S. Cl. ................................ 303/51; 303/74; 303/76; 303/128; 188/353
(58) Field of Search .................................... 303/1, 76, 74, 303/8, 9.66, 9.75, 128, 33, 40, 56, 50, 51; 137/868; 188/353; 251/324

(56) References Cited

U.S. PATENT DOCUMENTS

| | | | | |
|---|---|---|---|---|
| 2,869,581 | * | 1/1959 | Perez | 188/353 |
| 2,958,561 | * | 11/1960 | May | 303/8 |
| 3,272,565 | * | 9/1966 | Wilson | 303/8 |
| 3,532,117 | * | 10/1970 | Racki | 303/75 |
| 3,653,396 | * | 4/1972 | Logan | 251/324 |
| 4,179,165 | * | 12/1979 | Page et al. | 303/59 |
| 4,220,174 | * | 9/1980 | Spitz | 251/324 |
| 4,230,086 | * | 10/1980 | Lovret | 251/324 |
| 4,558,907 | * | 12/1985 | Reiss et al. | 303/74 |
| 4,775,194 | * | 10/1988 | Vaughn et al. | 303/74 |
| 5,297,777 | * | 3/1994 | Yie | 251/324 |
| 5,390,768 | * | 2/1995 | Borkowski | 188/353 |
| 5,439,276 | * | 8/1995 | Jerina et al. | 303/56 |
| 5,538,042 | * | 7/1996 | Baland | 251/324 |

* cited by examiner

Primary Examiner—Robert J. Oberleitner
Assistant Examiner—Thomas J. Williams
(74) Attorney, Agent, or Firm—James Ray & Associates

(57) ABSTRACT

A direct acting release cap for air brake control valves in trains which will allow for the manipulation of the valve characteristics from a direct brake release to a graduated brake release without removal of the cap from the body of the valve. This is accomplished through longitudinal movement of a spool, which directs internal air passages that control valve characteristics. The present invention eliminates the requirement of removing the direct acting release cap from the valve in order to change the working characteristics of the valve, thus resulting in a time savings for the operator.

20 Claims, 6 Drawing Sheets

DIRECT MANIPULATING DIRECT-GRADUATED RELEASE CAP FOR 26-TYPE CONTROL VALVES

FIELD OF THE INVENTION

The present invention is directed to a direct acting release cap for air brake control valves which will allow for the manipulation of the valve characteristics from a direct brake release to a graduated brake release without removal of the cap from the body of the valve. This release cap is particularly applicable to 26 control valves.

BACKGROUND OF THE INVENTION

A "26-L" air brake system is an equipment package which has been designed to meet present day train handling requirements. This system uses air, under pressure, for the braking of locomotives and trailing freight or passenger vehicles. This system has been designed and developed by the Westinghouse Airbrake Company (WABCO), the assignees of the present invention.

A "26-L" system includes air brake control valves on the cars/locomotives which are the primary controlling devices in this equipment arrangement. These valves provide the manual means for initiating air brake applications and releases. FIG. 1 shows a 26 control valve currently in use. This control valve has a service portion 13 which includes components thereon that allow for proper development of brake cylinder pressure proportional to the reduction or increase in brake pipe pressure, thus permitting stable operation of the automatic brake together with proper development of brake cylinder pressure. A release cap 14 is mounted on the service valve portion 13 and is used to manipulate the valve characteristics so that the valve can perform a "graduated" or "direct" release operation. A graduated release position is to be used for passenger type locomotive service in trains and a direct release position is to be used for freight type locomotive service.

These presently used release caps 14 necessitate their total removal thereof from the body of the valve in order to change the valve from a direct to a graduated or a graduated to a direct position. This requires excessive time and necessitates tool requirements. This time is considered a major hindrance when converting a set-up train from a direct brake cylinder system to a graduated brake cylinder system.

SUMMARY OF THE INVENTION

An object of the present invention is to provide a direct acting release cap for air brake control valves which will allow for the manipulation of the valve characteristics from a direct brake release to a graduated brake release and vice versa without removal of the cap from the body of the valve. This manipulation will facilitate a changeover from a freight to a passenger or from a passenger to a freight type locomotive service.

Another object of the present invention is to achieve this manipulation without the use of the tools previously required for the removal of the cap from the body of the valve.

The present invention is particularly applicable to the 26 control valves as described above but may be used with other types of air brake control valves known in the art.

The release cap comprises a housing which is connected to the valve through two mounting holes located on each side of the body. This housing contains a bushing having an internal member which is movable in a longitudinal manner so that the valve can be placed in a direct acting or a graduated acting position by connecting internal passages in the valve. The internal member can comprise a spool along with means attached to the release cap to give a positive locking feature to the mechanism through holes located in the spool. A wire is provided to prevent loss of this locking means. An alternative internal member can comprise a button/spring assembly for moving a spool.

The present invention allows an operator to quickly change the working characteristics of the control valve from a direct brake release to a graduated brake release and vice versa in that removal of the release cap from the control valve is no longer required to achieve this change. A direct brake release is typically used in freight type locomotive service and a graduated brake release is to be used for passenger type locomotive service in trains. The present invention also eliminates the need for the specific tools required to remove the release cap of the prior art. Thus, significant economic advantages can be realized from the direct acting Direct-Graduated release cap of the present invention.

Although a number of objects and advantages of the present invention have been described in some detail above, various additional objects and advantages of the direct acting Direct-Graduated release cap of the present invention will become much more readily apparent to those person who are skilled in the art from the following more detailed description of the invention, particularly, when such detailed description is taken in conjunction with both the attached drawing Figures and with the appended claims.

BRIEF DESCRIPTION OF THE INVENTION

DETAILED DESCRIPTION OF THE INVENTION

Figure 1:
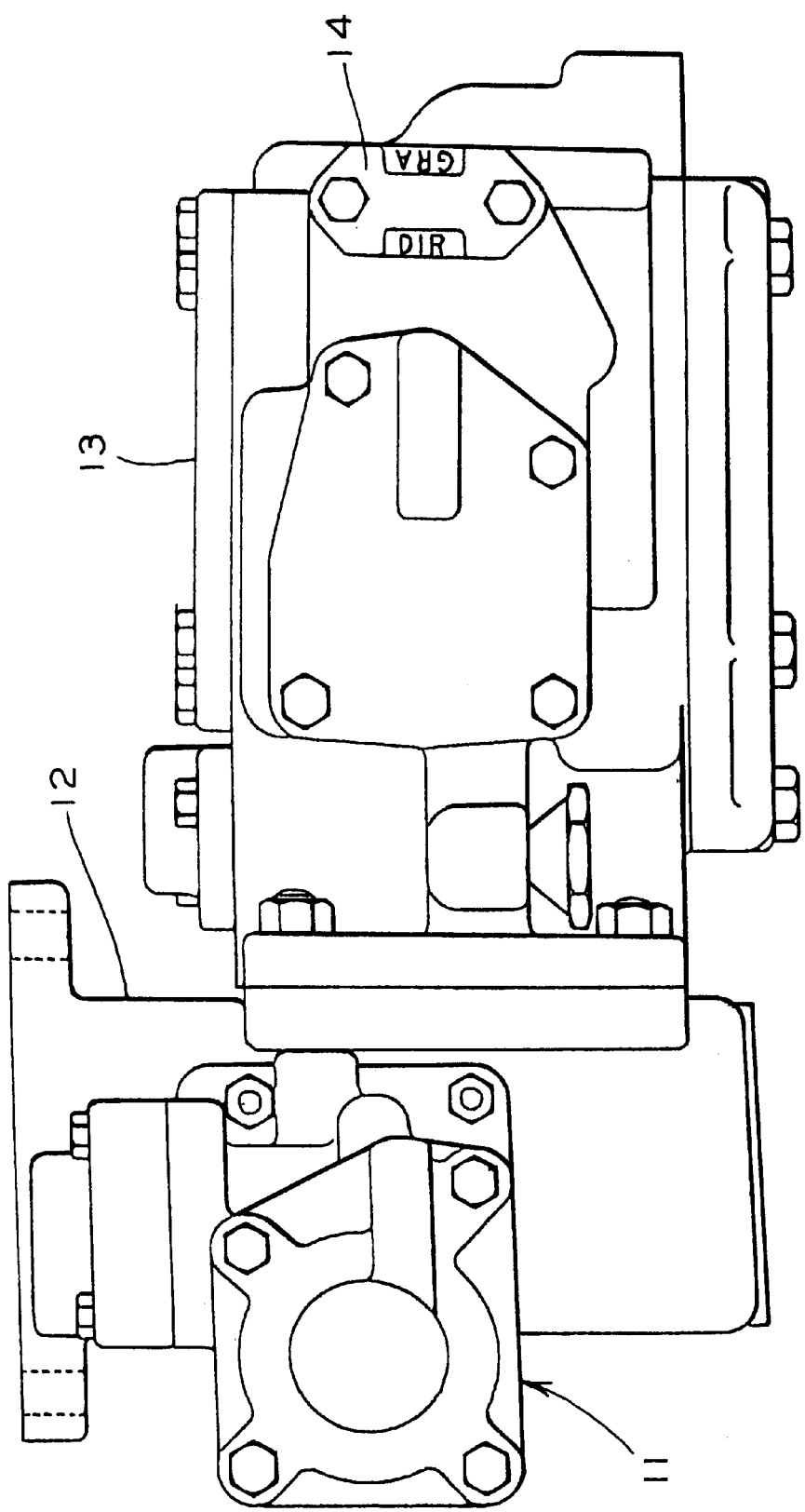
FIG. 1 is directed to a 26 control valve having a release cap of the prior art mounted thereon.

FIG. 1 shows a typical 26 control valve. This control valve comprises a quick release portion 11, a pipe bracket portion 12, and a service portion 13. The service portion 13 has mounted thereon the release cap 14 of the prior art. This cap requires manual removal from the valve to achieve changeover from a direct release to a graduated release portion. Note that the cap 14 has the letters "DIR" which represent a direct portion and the letters "GRA" which represent a graduated portion. These letters provide a reference to the operator as to the position of the cap at a given time.

Figure 2:
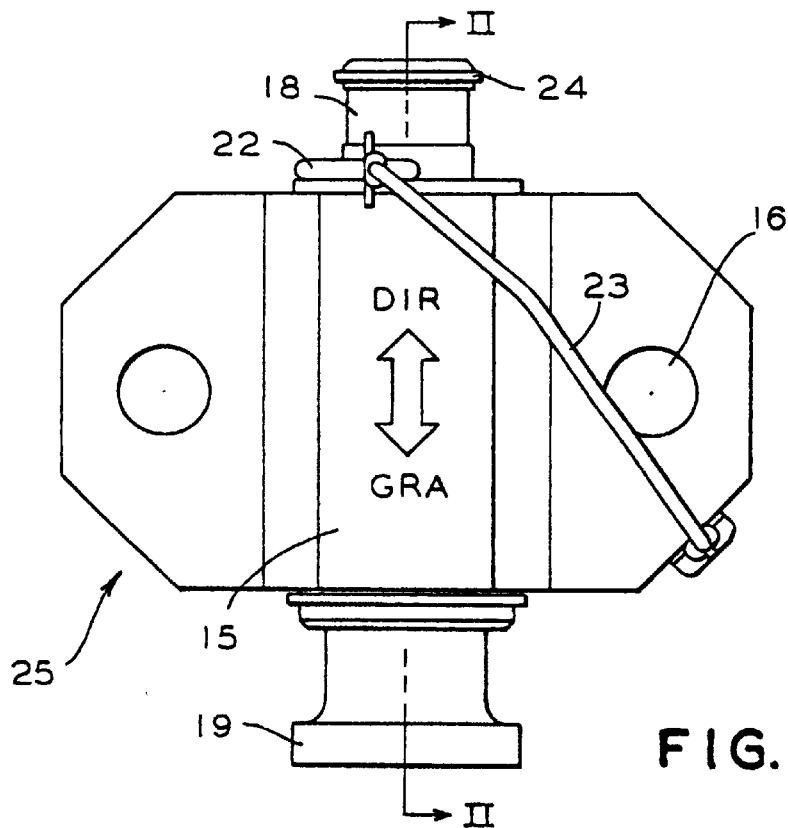
FIG. 2 is a top view of a direct acting release cap in the direct position according to a first embodiment of the present invention.
Figure 3:
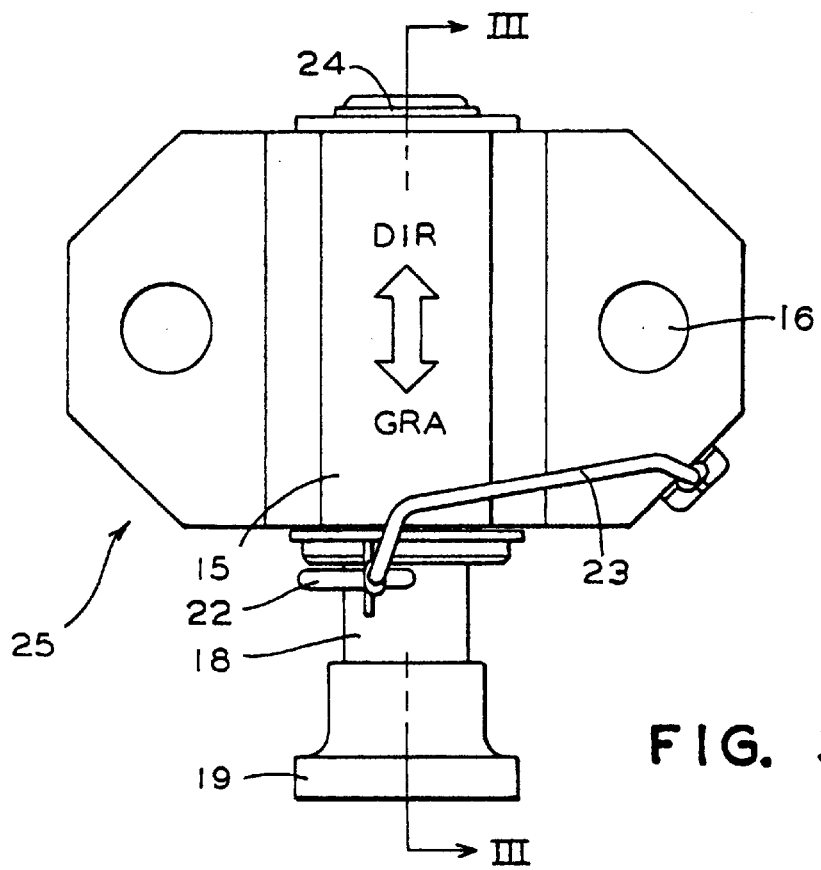
FIG. 3 is a top view of a direct acting release cap in the graduated position according to the first embodiment of the present invention.

FIGS. 2 and 3 show the direct acting release cap 25 according to a first embodiment of the present invention. FIG. 2 shows the direct acting release cap 25 in a direct position and FIG. 3 shows the direct acting release cap 25 in a graduated position. This release cap 25 can be used to replace the existing release cap 14 as depicted in FIG. 1. The release cap 25 comprises a housing body 15 which is connected to the valve through two mounting holes 16 located at each side of the housing body. The housing is typically made from aluminum, but other types of materials well known in the art may be used to make the housing. The housing can be attached to the valve by any well known means such as bolts, screws, and the like. The letters "DIR" and "GRA" are placed on the housing and are representative of a direct position and a graduated position, respectively.

Figure 5:
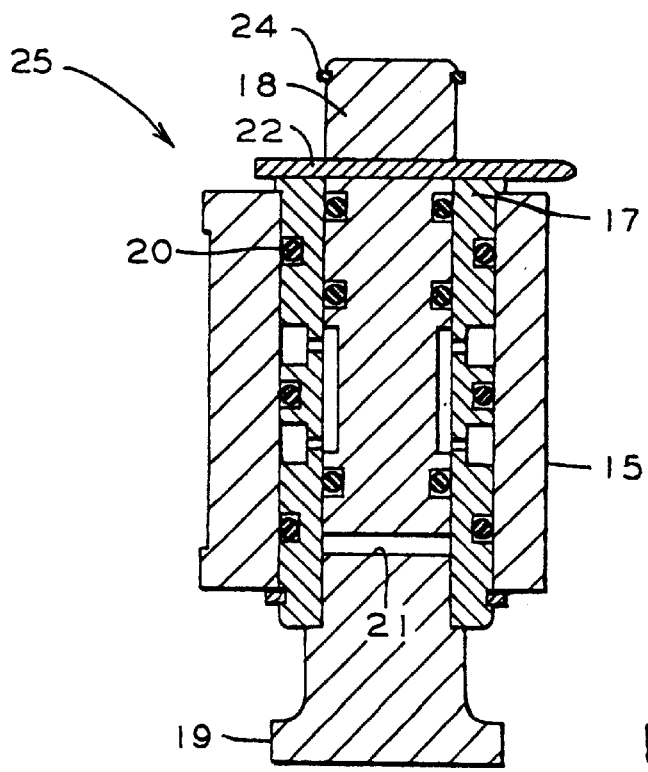
FIG. 5 is a cross-sectional view of the direct acting release cap taken along line 2—2 of FIG. 2.
Figure 6:
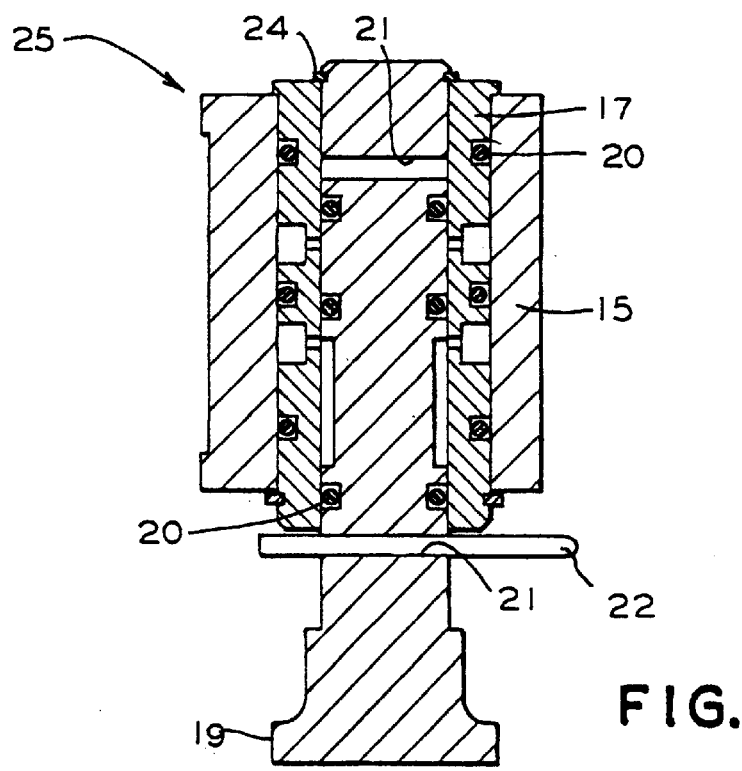
FIG. 6 is a cross-sectional view of the direct acting release cap taken along line 3—3 of FIG. 3.

FIGS. 5 and 6 show cross-sectional views taken along lines 2 and 3 of the direct acting release cap of FIGS. 2 and 3, respectively. The housing 15 contains a bushing 17 having a movable internal member or spool 18 placed therein. The spool 18 has a knob 19 on its end. The bushing 17 and the spool 18 include O-rings 20 along the length of their outer circumference. The spool 18 additionally includes a retaining ring 24 to prevent the spool 18 from being pulled out of the housing. Longitudinal movement of the spool 18 enables the valve to be placed in a direct acting (FIG. 5) or graduated acting (FIG. 6) position by connecting internal passages within the valve.

Figure 4:
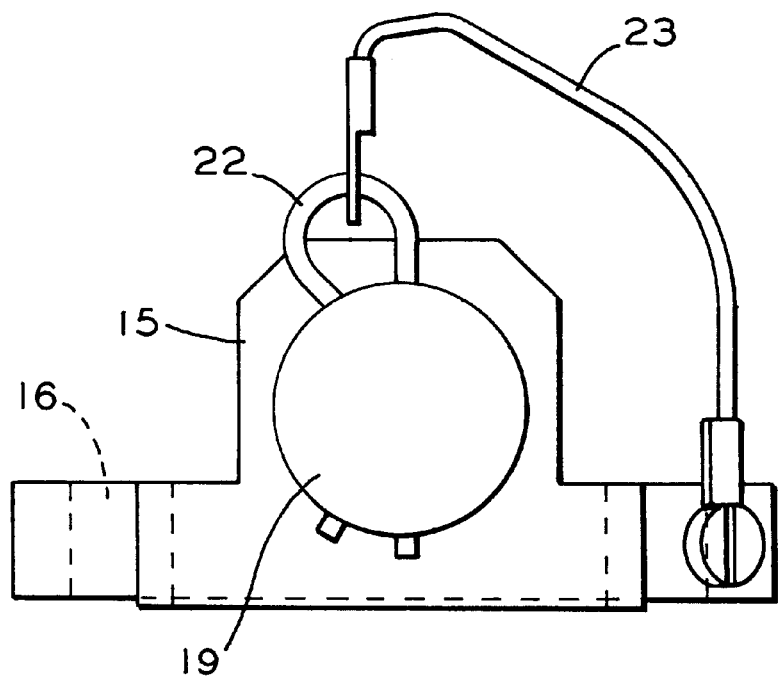
FIG. 4 is an end view of a direct acting release cap illustrated in FIGS. 2 and 3.

The spool 18 contains holes 21 located in various positions along its length. As illustrated in FIG. 4, a hairpin cotter 22 or pin is used to give a positive locking feature to the mechanism through these holes 21 so that the spool 18 can be locked in the direct or graduated acting position. A wire 23 is attached to the release cap and to the hairpin cotter to prevent a loss of the cotter should it be dropped by the operator during movement of the spool.

Figure 7:
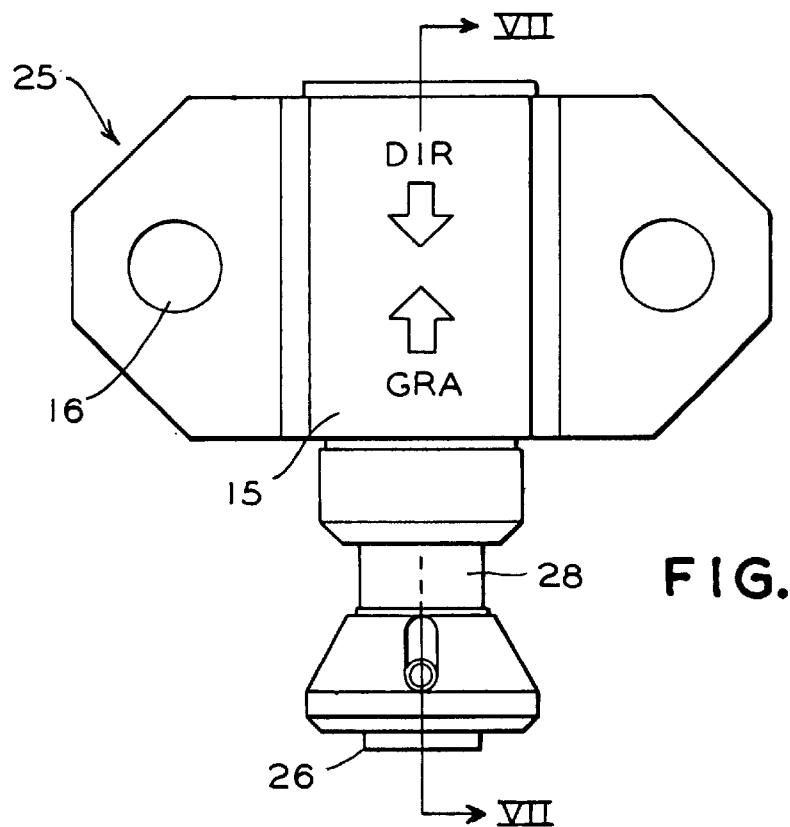
FIG. 7 is a top view of a direct acting release cap in the direct position according to a second embodiment of the present invention.
Figure 8:
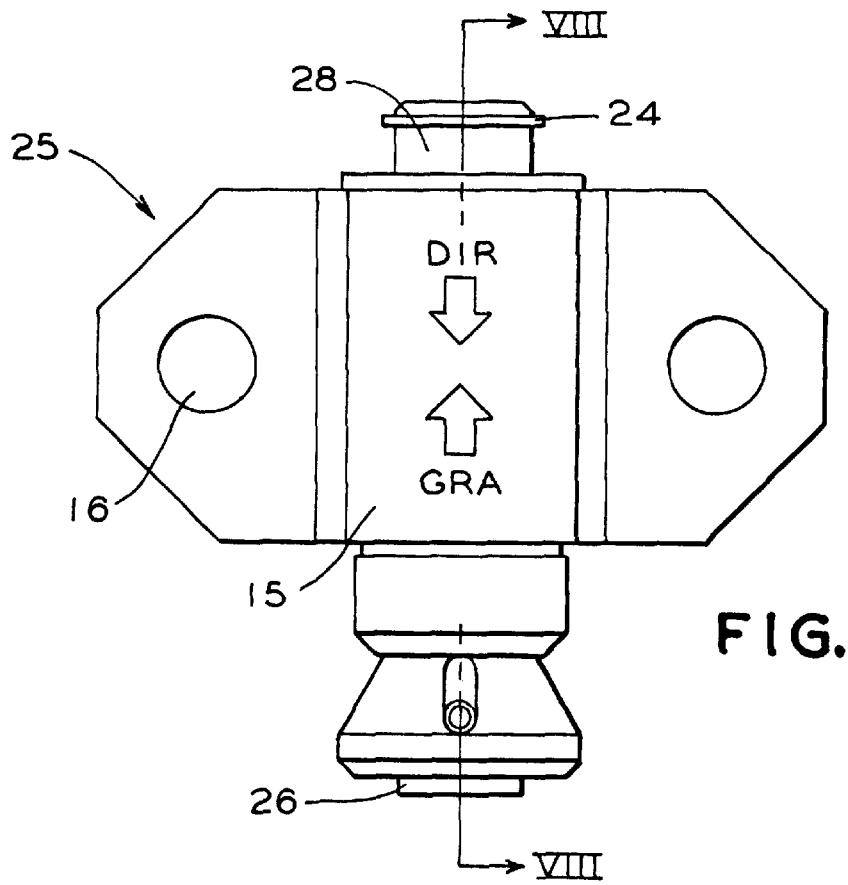
FIG. 8 is a top view of a direct acting release cap in the graduated position according to a second embodiment of the present invention.

FIGS. 7 and 8 show the direct acting release cap 25 according to a second embodiment of the present invention. FIG. 7 shows the direct acting release cap 25 in a direct position and FIG. 8 shows the direct acting release cap 25 in a graduated position. The release cap 25 comprises a housing body 15 which is connected to the valve through two mounting holes 16 located at each side of the housing body.

Figure 9:
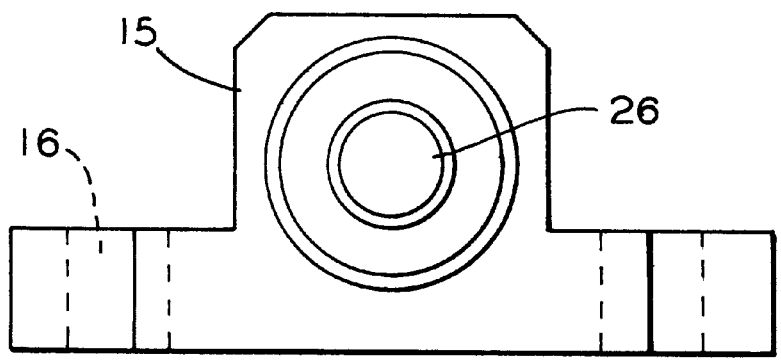
FIG. 9 is an end view of a direct acting release cap illustrated in FIGS. 7 and 8.
Figure 11:
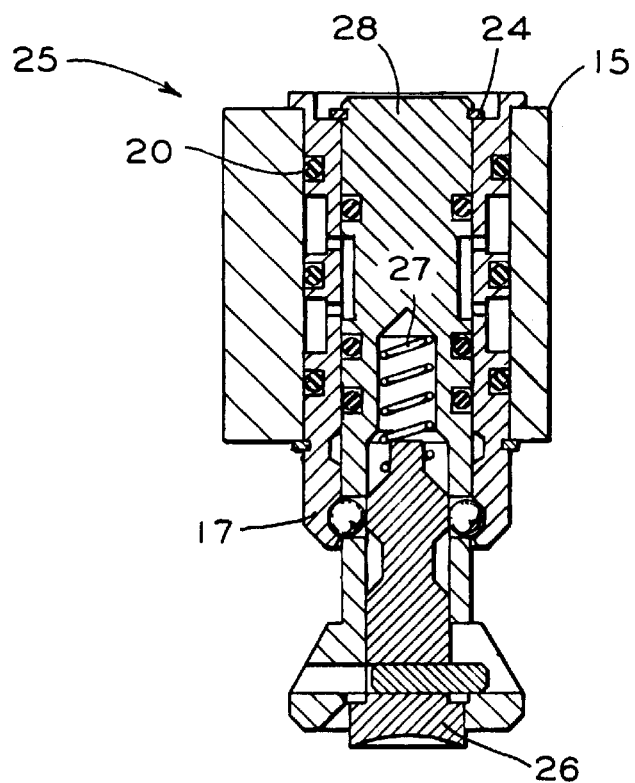
FIG. 11 is a cross-sectional view of the direct acting release cap taken along line 8—8 of FIG. 8.
Figure 10:
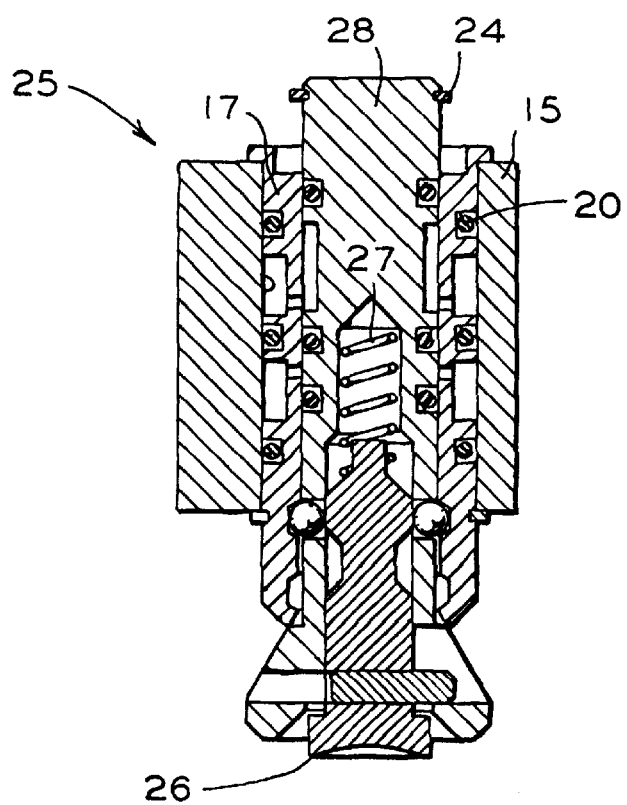
FIG. 10 is a cross-sectional view of the direct acting release cap taken along line 7—7 of FIG. 7.

As illustrated in FIGS. 9 and 10, the second embodiment of the direct acting release cap differs from the first embodiment in that the spool 18 is replaced with a button 26, spring 27, and spool 28 assembly. The spring 27 is compressed as shown in FIG. 11 so as to longitudinally position the spool 28 within the bushing 17 so that the valve is in the graduated brake release position. FIG. 10 shows the spring 27 in a released position such that the spool 28 is longitudinally moved within the bushing 17 placing the valve in a direct brake release position. Activation of the spring and longitudinal movement of the spool 28 is manually achieved by means of a button 26 as illustrated in FIG. 9. The bushing 17 and the spool 28 include O-rings 20 along the length of their outer circumference. The spool 28 additionally includes a retaining ring 24 to prevent the spool 28 from being undesirably removed from the housing.

The present invention provides for a direct acting Direct-Graduated release cap for 26 control valves which allows for the manipulation of valve characteristics from a direct brake release to a graduated brake release or from a graduated brake release to a direct brake release without removal of the cap from the body of the valve. This is accomplished through longitudinal movement of an internal member which directs internal air passages that control valve characteristics. This direct acting Direct-Graduated release cap eliminates the necessary tools and significantly reduces the time necessary to make this change. No longer is removal of an entire part from the valve necessary to change the working characteristics of the valve.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

What is claimed is:

1. A release cap engageable with a service portion of a brake control valve on a railcar for controlling brakes on said railcar, said release cap capable of alternatively switching said brake control valve between a direct state in which said brakes are released directly and a graduated state in which said brakes are released gradually without removal of said release cap from said brake control valve, said release cap comprising:

(a) a housing having a hollow portion therein and means for mounting the housing to the control valve;

(b) a spool positioned for movement in said hollow portion to at least a first and a second position, said movement from said first and second positions enabling connection of a series of internal passages within said air brake control valve so as to place said air brake control valve in one of said direct state and said graduated state;

(c) holes located in various positions within said spool; and (d) means capable of cooperating with one of said holes for locking said spool in said first position, said means also capable of cooperating with another one of said holes for locking said spool in said second position.

2. A release cap as recited in claim 1 wherein said means for mounting said housing to said control valve includes mounting holes positioned on each side of said housing.

3. A release cap as recited in claim 1 wherein said housing includes a bushing and said spool is placed within said bushing.

4. A release cap as recited in claim 1 wherein said means for locking said spool in at least one of said first and second position comprises a hairpin cotter.

5. A release cap as recited in claim 4 and further including an attaching means having a first and second end and wherein said first end of said attaching means is secured to said hairpin cotter and said second end of said attaching means is secured to said release cap to prevent loss of said hairpin cotter.

6. A release cap as recited in claim 5 wherein said attaching means is a wire.

7. A release cap as recited in claim 1 wherein said release cap is mounted on a 26 control valve.

8. A brake control valve for controlling brakes on a railcar including a release cap engageable with a service portion of said brake control valve, said release cap comprising:

(a) a housing having a hollow portion therein;
(b) a means for directing internal air passages within said control valve to manipulate said brake control valve such that said valve may be alternatively switched between a direct state in which said brakes are released directly and a graduated state in which said brakes are released gradually without removal of said release cap from said brake control valve, said means including a spool having holes located in various positions therein, said spool being positioned for longitudinal movement in said hollow portion to at least a first and a second position to alternatively switch said valve between said direct state and said graduated state; and
(c) means capable of cooperating with one of said holes for locking said spool in said first position, said means also capable of cooperating with another one of said holes for locking said spool in said second position.

9. A brake control valve including a release cap as recited in claim 8 wherein said housing includes a bushing and said spool is placed within said bushing.

10. A brake control valve including a release cap as recited in claim 8 wherein said means for locking said spool in location comprises a hairpin cotter.

11. A brake control valve including a release cap as recited in claim 8 and further including an attaching means having a first and second end, said first end of said attaching means secured to said hairpin cotter and said second end of said attaching means secured to said release cap to prevent loss of said hairpin cotter.

12. A brake control valve including a release cap as recited in claim 11 wherein said attaching means is a wire.

13. A brake control valve including a release cap as recited in claim 8 wherein said control valve is a 26 control valve.

14. A release cap engageable with a service portion of a brake control valve on a railcar for controlling brakes on said railcar, said release cap capable of alternatively switching said brake control valve between a direct state in which said brakes are released directly and a graduated state in which said brakes are released gradually without removal of said release cap from said brake control valve, said release cap comprising:
(a) a housing having a hollow portion therein and means for mounting the housing to the control valve;
(b) an internal member positioned for movement in said hollow portion to at least a first and a second position, said movement from said first and second position enabling connection of a series of internal passages within said air brake control valve so as to place said air brake control valve in one of said direct state and said graduated state, said internal member comprising a spool, a spring and a button positioned in longitudinal alignment with one another, said button enabling one of manual compression and release of said spring to cause said spool to move within said housing; and
(c) means for locking said internal member in at least one of said first and said second position.

15. A release cap as recited in claim 14 wherein said means for mounting said housing to said control valve includes mounting holes positioned on each side of said housing.

16. A release cap as recited in claim 14 wherein said housing includes a bushing and said internal member is placed within said bushing.

17. A release cap as recited in claim 14 wherein said release cap is mounted on a 26 control valve.

18. A brake control valve for controlling brakes on a railcar including a release cap engageable with a service portion of said brake control valve, said release cap comprising
(a) a housing having a hollow portion therein;
(b) an internal member for directing internal air passages within said control valve to manipulate said brake control valve such that said valve may be alternatively switched between a direct state in which said brakes are released directly and a graduated state in which said brakes are released gradually without removal of said release cap from said brake control valve, said internal member including a spool, a spring, and a button positioned in longitudinal alignment with one another, said button enabling one of manual compression and release of said spring to cause said spool to move within said housing to at least a first and a second position to alternatively switch said valve between said direct state and said graduated state; and
(c) means for locking said internal member in at least one of said first and said second position.

19. A brake control valve including a release cap as recited in claim 18 wherein said housing includes a bushing and said internal member is placed within said bushing.

20. A brake control valve including a release cap as recited in claim 18 wherein said control valve is a 26 control valve.

\* \* \* \* \*